(12) United States Patent
Fischer

(10) Patent No.: US 10,370,016 B2
(45) Date of Patent: Aug. 6, 2019

(54) METHOD AND DEVICE FOR CARRYING OUT A TEST PROCESS RELATING TO A RAIL VEHICLE

(71) Applicant: SIEMENS AKTIENGESELLSCHAFT, Munich (DE)

(72) Inventor: Harald Fischer, Fuerth (DE)

(73) Assignee: Siemens Mobility GmbH, Munich (DE)

( * ) Notice: Subject to any disclaimer, the term of this patent is extended or adjusted under 35 U.S.C. 154(b) by 112 days.

(21) Appl. No.: 15/539,288

(22) PCT Filed: Dec. 2, 2015

(86) PCT No.: PCT/EP2015/078312
§ 371 (c)(1),
(2) Date: Jun. 23, 2017

(87) PCT Pub. No.: WO2016/102160
PCT Pub. Date: Jun. 30, 2016

(65) Prior Publication Data
US 2017/0361856 A1    Dec. 21, 2017

(30) Foreign Application Priority Data
Dec. 23, 2014    (DE) .................. 10 2014 226 910

(51) Int. Cl.
*B61L 27/00*    (2006.01)
*B60L 3/12*    (2006.01)
(Continued)

(52) U.S. Cl.
CPC ............ *B61L 27/0055* (2013.01); *B60L 3/12* (2013.01); *B61L 27/0088* (2013.01);
(Continued)

(58) Field of Classification Search
CPC ............ B61L 27/0055; B61L 27/0088; B61L 27/0094; B61L 23/042; B60L 3/12;
(Continued)

(56) References Cited

U.S. PATENT DOCUMENTS

| 4,041,283 | A | * | 8/1977 | Mosier | ..................... G09B 9/04 |
| | | | | | 105/61 |
| 5,445,347 | A | * | 8/1995 | Ng | ............................ B60L 3/12 |
| | | | | | 246/169 R |

(Continued)

FOREIGN PATENT DOCUMENTS

| CN | 103631147 A | 3/2014 |
| DE | 102007051126 A1 | 4/2009 |
| WO | 2014044484 A2 | 3/2014 |

*Primary Examiner* — Frederick M Brushaber
(74) *Attorney, Agent, or Firm* — Laurence Greenberg; Werner Stemer; Ralph Locher

(57) ABSTRACT

A method for carrying out a test process relating to a rail vehicle achieves a fast-working, flexible, and in the event of a misdetection, precise monitoring environment, in particular without complex system or architectural adjustments to the rail vehicle. A stationary control unit and a simulation unit are provided on the land side. A data connection is established between the stationary control unit and the rail vehicle. A data connection is established between the stationary control unit and the simulation unit. The test process includes providing data traffic between the stationary control unit and the rail vehicle and the simulation unit. A device for carrying out a test process relating to a rail vehicle is also provided.

14 Claims, 4 Drawing Sheets

(51) Int. Cl.
    *G01M 17/08*    (2006.01)
    *B61K 9/10*     (2006.01)
    *B61L 23/04*    (2006.01)

(52) U.S. Cl.
    CPC ......... *B61L 27/0094* (2013.01); *G01M 17/08* (2013.01); *B60L 2200/26* (2013.01); *B60L 2240/70* (2013.01); *B61K 9/10* (2013.01); *B61L 23/042* (2013.01)

(58) Field of Classification Search
    CPC ............ B60L 2200/26; B60L 2240/70; G01M 17/08; B61K 9/10
    See application file for complete search history.

(56) References Cited

U.S. PATENT DOCUMENTS

| | | | | |
|---|---|---|---|---|
| 8,398,405 B2 * | 3/2013 | Kumar | ................... | B61C 17/12 |
| | | | | 434/65 |
| 8,401,720 B2 * | 3/2013 | Daum | ..................... | B61L 3/006 |
| | | | | 246/182 C |
| 8,565,946 B2 * | 10/2013 | Cooper | ................... | B61L 3/006 |
| | | | | 701/19 |
| 8,781,671 B2 * | 7/2014 | Beck | ..................... | B60T 13/665 |
| | | | | 340/453 |
| 9,151,232 B2 * | 10/2015 | Kumar | ................ | F02D 19/0639 |
| 9,193,268 B2 * | 11/2015 | Kumar | ................ | F02D 19/0665 |
| 9,205,849 B2 * | 12/2015 | Cooper | ................... | B61L 3/121 |
| 9,233,696 B2 * | 1/2016 | Kumar | .................... | B61L 3/006 |
| 9,393,975 B2 * | 7/2016 | Chen | ..................... | B61L 15/0027 |
| 2004/0026574 A1 * | 2/2004 | Seifert | .................... | B61L 23/34 |
| | | | | 246/5 |
| 2007/0260372 A1 | 11/2007 | Langer | | |
| 2007/0260373 A1 | 11/2007 | Langer et al. | | |
| 2007/0275355 A1 | 11/2007 | Langer et al. | | |
| 2009/0173839 A1 * | 7/2009 | Groeneweg | ........... | B61L 23/042 |
| | | | | 246/15 |
| 2010/0318246 A1 | 12/2010 | Bieker et al. | | |
| 2011/0066351 A1 * | 3/2011 | Gallagher | ........... | F02D 41/2422 |
| | | | | 701/102 |
| 2015/0247781 A1 | 9/2015 | Fischer et al. | | |
| 2015/0251677 A1 | 9/2015 | Fischer et al. | | |
| 2017/0308802 A1 * | 10/2017 | Ramsoy | ................ | G06N 7/005 |

* cited by examiner

METHOD AND DEVICE FOR CARRYING OUT A TEST PROCESS RELATING TO A RAIL VEHICLE

BACKGROUND OF THE INVENTION

Field of the Invention

The invention relates to a method for carrying out a test process relating to a rail vehicle.

The operation of rail vehicles is characterized today by ever stricter safety requirements. In addition, there are further requirements for the rail operator which—to reduce costs in connection with operational failures and breakdown repairs—demand low failure rates, long maintenance intervals and short service times. To take account of these requirements, redundant systems or special architectures are developed for rail vehicles.

SUMMARY OF THE INVENTION

The object underlying the invention is to create a method of the aforementioned kind for which a fast-working, flexible, and in the event of fault detection, precise monitoring environment can be achieved, in particular, without complex system or architectural adjustments to the rail vehicle.

To this end, it is proposed that a stationary control unit and a simulation unit are provided on the land side, a data connection is established between the stationary control unit and the rail vehicle, a data connection is established between the stationary control unit and the simulation unit, and the test process comprises data traffic between the stationary control unit and the rail vehicle and the simulation unit. As a result, a monitoring environment can be provided which enables fast and accurate fault detection and a high degree of flexibility. Flexibility can in particular be achieved because mutual influencing of the "rail vehicle" and "simulation unit" systems is possible on account of the data traffic between the rail vehicle and the simulation unit. In particular, in the form of the stationary control unit a—preferably coherent—unit is created which handles process data of a vehicle process and simulation data of the simulation unit, in particular, simultaneously—i.e. at least during the same period of time.

In the event of a fault in the operating procedure of the rail vehicle, with the support of the stationary control unit a fault can be detected quickly and accurately by means of a simulation process. This has the further advantage of enabling troubleshooting measures to be taken quickly and selectively.

The stationary control unit usefully has at least one processor unit which is designed to execute test program modules, and one storage unit which is used for storing the test program modules. These program modules expediently form part of software of which one version is installed in the rail vehicle and which, in particular, is created for sequence control of vehicle processes in the rail vehicle.

Customary transfer protocols protected from external attacks are employed for the establishment of the data connection between the stationary control unit and the rail vehicle. Particularly preferably this data connection is built redundantly.

In a preferred embodiment of the invention the simulation unit has vehicle components and a simulation environment in which the components are embedded. In a simulation mode, the simulation unit is used for testing the vehicle components which are embedded in the simulation environment and which reproduce the real environment of the corresponding vehicle components in the rail vehicle. The vehicle components may comprise hardware components—such as, for example, actuators or controllers—and/or software components—such as, for example, program modules of a controller. The simulation environment preferably forms an environment for which the technical term is "hardware-in-the-loop" or "software-in-the-loop". Traditional simulation components comprising simulation programs and/or mechanical simulators can be used to form the simulation unit. These are used in simulation mode to support the development of a new rail vehicle.

According to an advantageous embodiment of the invention it is proposed that process data of a vehicle process is transferred to the stationary control unit and the stationary control unit performs an assessment of the process data on the basis of simulation data of a simulation process. By this means, a test mode of the stationary control unit can be created in which a current status in the rail vehicle is shown by the process data of the vehicle process, simulation data generated by the simulation process show a target status in the rail vehicle and a comparison is made between the current status and the target status with the evaluation of the process data of the rail vehicle and the simulation data. In this test mode, a fault can be detected particularly quickly and accurately in the operation of the rail vehicle. In particular, a target/current comparison can be made, if possible in real time, in particular, during line operation of the rail vehicle.

In a development of the invention it is proposed that process data of a vehicle process is transferred to the stationary control unit and the stationary control unit effects a change of simulation data of the simulation unit on the basis of the process data. By this means an adjustment mode of the stationary control unit can be established which is used for the adjustment of the simulation unit and in which a current status is shown in the rail vehicle by the process data of the vehicle process and the simulation data is adjusted to the current status. This adjustment mode can, in particular, be used to take into account changes to the rail vehicle or changes which, for example, are the result of a malfunction of a vehicle component, for adjustment of data of the simulation unit. This adjustment of data may, in particular, comprise an adjustment of simulation parameters which are relevant to the embedding simulation environment and on the basis of which a simulation process is carried out, and/or an adjustment of program modules with which a simulation is carried out.

Furthermore, it is proposed that the stationary control unit influences at least one vehicle process at least partially on the basis of simulation data of a simulation process. Hereby a test mode of the stationary control unit can be established in which the vehicle process is tested. This can be performed by the stationary control unit on the basis of parameters which are determined and/or prescribed by means of the simulation process. The simulation data is usefully taken as the basis for the vehicle process which is at least partially influenced or to be influenced. In particular, the vehicle process can be tested by a parameter—e.g. an input parameter and/or a condition parameter—of the vehicle process being prescribed for it on the basis of the simulation data, wherein this parameter differs from a real value in the rail vehicle. Thereby, test conditions which differ from real conditions can be artificially created in the rail vehicle.

The "at least partial influence" of a process by the stationary control unit is understood to mean a process comprising at least the triggering, initiation, activation, controlling, regulation, alteration and/or termination of the process by the stationary control unit.

The at least partial influence takes place expediently by means of a control connection which is established and operated between the stationary control unit and at least one control unit of the rail vehicle by means of the data connection and in particular, enables the transfer of command data of the stationary control unit to the at least one control unit of the rail vehicle. The at least one control unit of the rail vehicle may be a central control unit superior to local control units, in particular, local subsystem controllers. For example, the at least one control unit may correspond to a central control device (or "CCD") of the rail vehicle. If the vehicle process is a process of a local subsystem, the control connection can be established with the central control unit which is commanded by the stationary control unit to influence the local vehicle process concerned at least partially. Alternatively, the control connection can be established and operated between the stationary control unit and the corresponding local control unit at least partially responsible for carrying out the vehicle process, wherein this control connection is preferably established by way of the central control unit.

For the at least partial influencing of the vehicle process by the stationary control unit, the aforementioned program modules of software, of which one version is installed in the rail vehicle and which in particular, is intended for the sequence control of vehicle processes, are used advantageously.

In particular, it is proposed that the simulation data reproduce at least one fault in the rail vehicle.

In this way, a fault can be injected into at least one subsystem of the rail vehicle, whereby a reaction thereof to the fault can be recorded and evaluated. As aforementioned, this evaluation can be based on a comparison of a current status in the rail vehicle, which is associated with the behavior of the rail vehicle in the event of a fault, with a target status in the rail vehicle determined by the simulation unit, which characterizes a target behavior of the rail vehicle. By means of this test mode, fault situations, in particular, unsafe conditions of the rail vehicle can be effectively prevented.

Furthermore, it is proposed that process data of a vehicle process are transferred to the stationary control unit and the stationary control unit effects the performance of a simulation process on the basis of the process data. This is advantageous as part of an adjustment, in particular, the training of the simulation unit.

In the aforementioned embodiment, in which the simulation unit has vehicle components and a simulation environment in which the components are embedded, it is proposed that the simulation environment has an interface by way of which data communication is established with a computer-aided development system. A "computer-aided development" is understood to mean the support of work processes in technology, wherein the supported work processes at least include the production of a design, in particular, a construction design (or "Computer Aided Design", also "CAD"), the production of a numerical control—also referred to as "NC programming" (i.e. programming of a "numerical control")—in the context of manufacturing (or "Computer Aided Manufacturing", also "CAM") and/or further processes generally forming part of computer-aided development in accordance with the technical term "Computer Aided Engineering" (also "CAE"). In the proposed embodiment, in which data of such a system can be transferred to the simulation unit, changes made in this system can be taken into account by the simulation unit automatically and advantageously in real time. The data communication between the computer-aided development system and the simulation unit can be supported by a format conversion unit—e.g. in the form of a "parser"—which forms part of the interface.

The function of the computer-aided development system is expediently based on at least one data set of simulation data from the group: circuit diagram data, component libraries and library data for a design program.

In this context and in connection with the aforementioned embodiment in which process data of a vehicle process is transferred to the stationary control unit and the stationary control unit effects a change of simulation data of the simulation unit on the basis of the process data, it is proposed that the change comprises an adjustment of the at least one data set on the basis of the process data. Hereby, changes in the configuration of the rail vehicle which are recorded on the basis of the process data can be reproduced in the at least one data set of the computer-aided development system, whereby a largely automatic update of the simulation unit can be achieved. If the data set comprises circuit diagram data, circuit diagrams can be generated largely automatically by the simulation unit.

Moreover, it is proposed that the test process is performed during line operation of the rail vehicle. Hereby, comprehensive, targeted and preferably automatic monitoring of the rail vehicle is possible during the journey on a line. A test process is preferably carried out which does not affect the safety of the passengers in any way. In particular, a test process is preferably carried out in which a current status in the case of the rail vehicle is compared with a target status determined by the simulation unit.

This is advantageous in connection with personal protection as an unsafe condition of the rail vehicle can be detected particularly advantageously by means of a test process during line operation. Specific measures can quickly be taken to restore the rail vehicle to a safe condition. Safety requirements which are prerequisites for vehicle registration can be met hereby. "Safety requirements" are understood to mean, in particular, requirements which are defined in the standards EN 50128, 50159, 50126 and/or 50129 and in particular, are aimed at personal protection.

In particular, emergency braking of the rail vehicle can be triggered in the event of an unsafe condition.

Moreover, the invention relates to a device for carrying out a test process relating to a rail vehicle. It is proposed that the device is equipped with a stationary control unit, a simulation unit and a data interface which are provided on the land side, wherein the stationary control unit is operatively connected to the simulation unit in terms of data and is designed to establish a data connection with the rail vehicle by way of the data interface and to perform the test process on the basis of data traffic between the rail vehicle and the simulation unit. A monitoring environment can hereby be provided which enables fast and accurate fault detection and a high degree of flexibility. With regard to advantageous effects and characteristics of the proposed device, reference is made to the embodiment above regarding the proposed method.

BRIEF DESCRIPTION OF THE SEVERAL VIEWS OF THE DRAWING

An exemplary embodiment of the invention is explained on the basis of the diagrams. The diagrams show.

DESCRIPTION OF THE INVENTION

Figure 1:
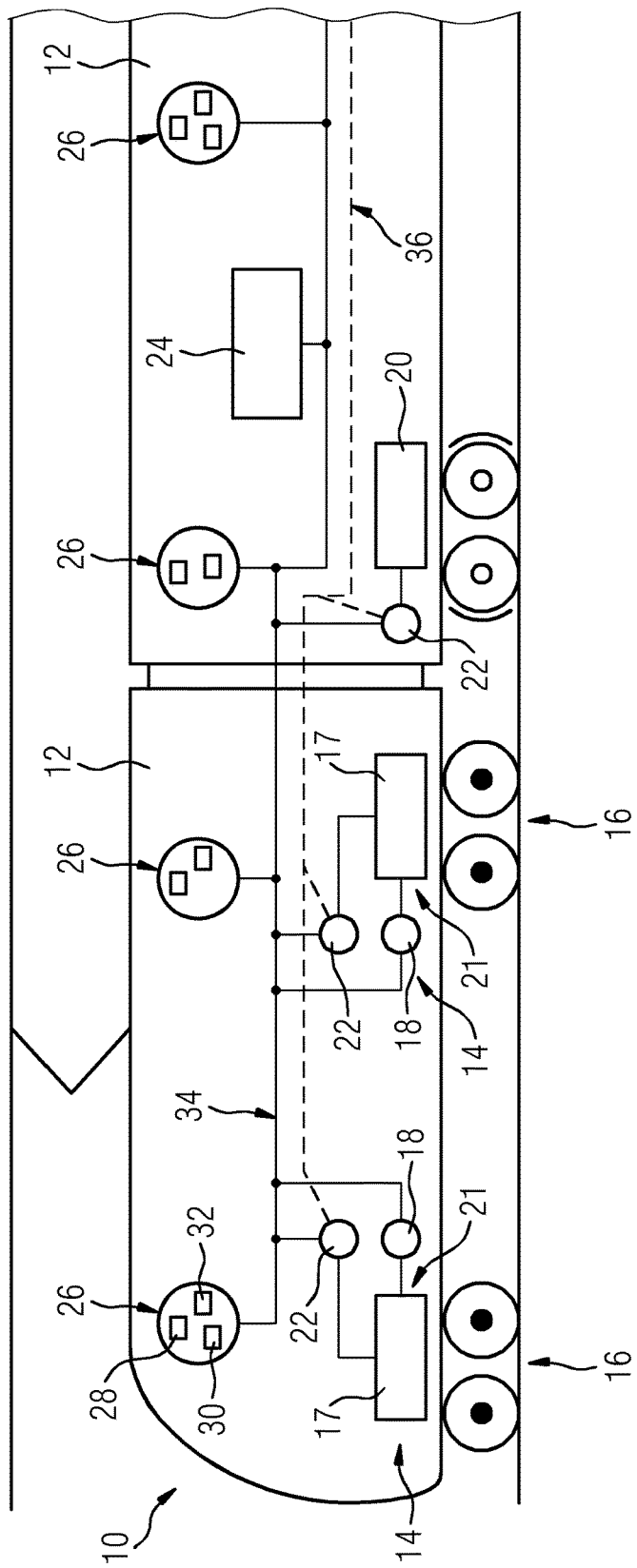
FIG. 1 a rail vehicle in a diagrammatic lateral view.

FIG. 1 shows a rail vehicle 10 in a diagrammatic lateral view. It is designed as an assembly of carriages 12 which are each intended for the transport of passengers, wherein at least one carriage 12 is designed as a railcar. The embodiment of the rail vehicle 10 as a motor train set for the transport of passengers is exemplary. Alternatively, the rail vehicle can be designed as a locomotive or as an assembly of a locomotive with coupled passenger carriages.

In the embodiment considered, for example, the end cars are designed as railcars. A railcar has at least one drive unit 14 which is assigned at least one traction bogie 16, in particular, a motored bogie and is designed to drive at least one drive axle of the assigned traction bogie 16. The rail vehicle 10 has drive units 14 which each have at least one traction motor (not shown), a power supply unit 17 and a drive controller 18. This is used for the control of the power supply of the traction motor by the power supply unit 17, which is particularly designed as an inverter.

Moreover, the rail vehicle 10 has a braking system with a set of brake units 20 which, in particular, are designed as pneumatically actuateable friction brakes, and as brake units 21 designed as electric motor brakes which are constituted by the set of drive units 14. The brake units 20 and 21 are controlled by means of brake control units 22. In addition, the rail vehicle 10 comprises a central control unit 24 which takes precedence over local controls, in particular, the drive controllers 18 and the brake control units 22.

Besides the drive units 14 and the braking system, the rail vehicle 10 has additional subsystems 26 which each comprise at least one control unit 28, one actuator 30 and/or one sensor unit 32. The subsystems 26 and their internal components are shown in a highly diagrammatic view in the figure.

The drive units 14, the brake units 20, 21 and the additional subsystems 26 are connected to a data bus system 34 of a network of the rail vehicle 10. The data bus system 34 is shown diagrammatically and may comprise several data buses, different from each other and interconnected in terms of data. The central control unit 24 is likewise connected to the data bus system 34, wherein data communication to transfer information, control data and/or sensor data between a subsystem 26 and the central control unit 24 takes place by way of the data bus system 34.

Moreover, the rail vehicle 10 comprises a set of protection loops 36 which are each assigned a safety function of the rail vehicle 10. A typical example is an emergency brake loop by means of which emergency braking can be triggered by a passenger.

Figure 2:
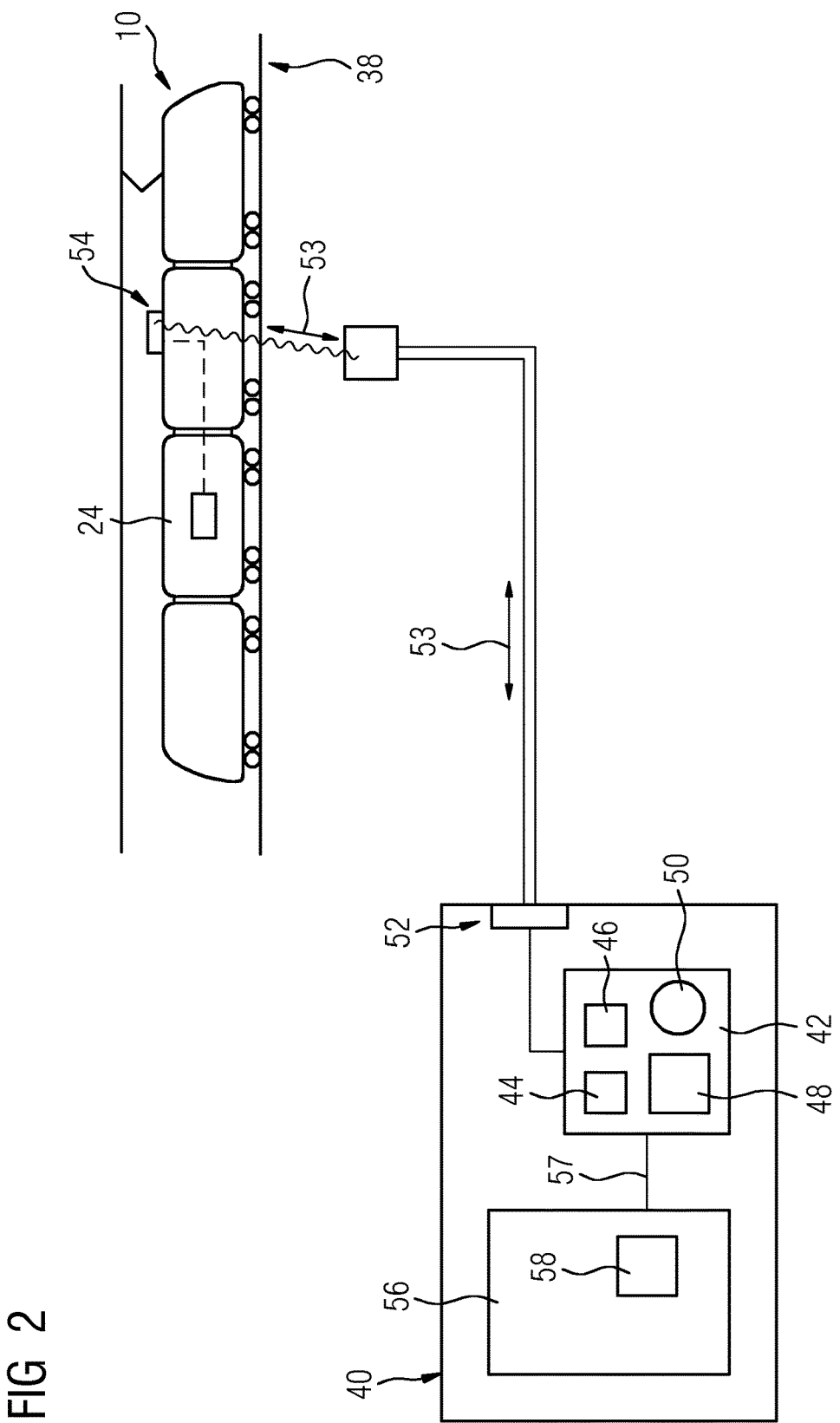
FIG. 2 a system comprising the rail vehicle and a test center, having a control unit and a simulation unit, FIG. 3 the simulation unit in a diagrammatic detailed description and FIG. 4 an interaction between components of the rail vehicle and the control unit of the test center.

FIG. 2 shows the rail vehicle 10 in a simplified view compared to FIG. 1 on a line 38 and a test center 40 on the land side. In this test center, there is at least one control unit 42 which can be operated by a person. The control unit 42 has at least one input device 44 for this purpose which is used by the person to input data, and an output device 46 which is designed for the output, in particular, for the at least optical output of data to the person. Opposite the central control unit 24 of the rail vehicle 10, the control unit 42 of the test center is called the "stationary control unit". For example, the stationary control unit can be designed as a PC (or "Personal Computer"). By operating the stationary control unit 42, as described below, test processes can be performed in the rail vehicle 10. Alternatively, or in addition, these test processes can be performed automatically, i.e. without necessitating the operation of the control unit 42, wherein information about the procedures and results of test processes is output automatically by means of the output device 46. It is conceivable that the control unit 42 is designed without a man-machine interface, i.e. without an input and output device.

The stationary control unit 42 has at least one processor unit 48 and one storage unit 50 in which program modules for carrying out test processes are stored by the processor unit 48.

Moreover, the test center 40 has a data interface 52 by way of which a data connection 53 can be established with the rail vehicle 10. To this end, the rail vehicle 10 comprises a data interface 54 by way of which a data connection with the data interface 52 of the test center 40 can be established. The data connection 53 between the data interfaces 52 and 54 can be established at least partially wired. A connection established between the data interfaces 52, 54 is used, in particular, to set up the data connection 53 between the stationary control unit 42 and the rail vehicle 10, in particular, its central control unit 24. To this end, the stationary control unit 42 is in operative connection with the data interface 52 in terms of data and the central control unit 24 of the rail vehicle 10 is in operative connection with the data interface 54 in terms of data.

In addition, the test center 40 has a simulation unit 56 by means of which simulation processes are performed. The stationary control unit 42 is in operative connection with at least one computing unit 58 of the simulation unit 56 in terms of data by way of a data connection 57.

Figure 3:
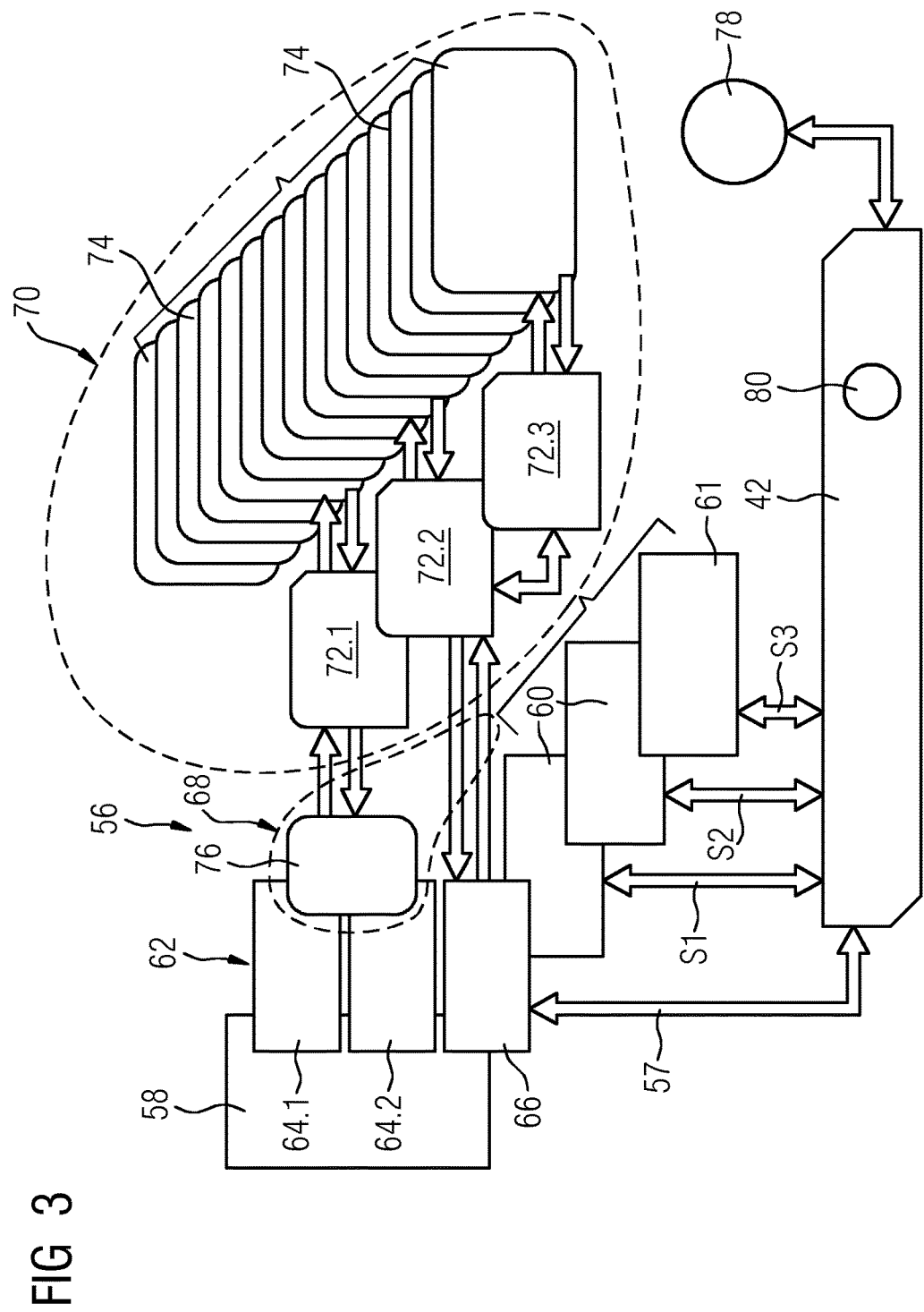

The simulation unit 56 is shown in more detail in FIG. 3. The data connection 57 of the simulation unit 56 with the stationary control unit 42 and this control unit 42 are likewise shown. The simulation unit 56 has vehicle components 60 in the form of hardware, e.g. control devices, mechanical actuators etc. and/or of software, e.g. control programs, regulation programs, etc. which are embedded in a simulation environment 62. The vehicle components 60 correspond to real components which are arranged in the rail vehicle 10. In addition, the vehicle components 60 can be connected to each other by wiring 61 which corresponds to real wiring in the rail vehicle 10. The simulation environment 62 has a set of simulation programs 64.1, 64.2 and mechanical simulators 66 which can be executed or controlled by means of the computing unit 58. In a development phase, these simulation programs 64 or mechanical simulators 66 can be individually operated by a person. The vehicle components 60, the wiring 61 together with the simulation environment 62 form a system for which the technical term is "hardware-in-the-loop" (or "HIL") or "software-in-the-loop" (or "SIL"). The components of the simulation environment 62 are used to reproduce the real environment of the vehicle components 60 in the system constituted by the rail vehicle 10. Known simulation programs 64 are e.g. Labview® or dSPACE®.

As aforementioned, the stationary control unit 42 is in operative connection with the computing unit 58 of the simulation unit 56 in terms of data, wherein the computing unit 58 is used to perform the simulation programs 64.1, 64.2. To this end, the computing unit 58 is equipped with at least one processor unit (not shown).

Furthermore, the simulation unit 56 has an interface 68 by way of which data of a computer-aided development system 70 is received by the simulation environment 62. The computer-aided development system 70 has a set of development programs 72.1, 72.2, 72.3 which are performed by corresponding control units or by a superior control unit (not shown). For example, the development program 72.1 is a general CAE program (or "Computer-aided Engineering"). The development program 72.2 may, in particular, be a design program or CAD program (or "Computer-aided Design"). The development program 72.3 may, in particular, be a manufacturing program or CAM program (or "Computer-aided Manufacturing"). These development programs 72 are each connected to corresponding data sets 74 of simulation data for access. These data sets 74 are, in particular, circuit diagram data, component libraries and/or library data for the design program.

The development program 72.2. is preferably in operative connection with the mechanical simulators 66, on the one hand, and with the development program 72.3, on the other hand. The development program 72.1 is preferably in operative connection with the simulation programs 64.1, 64.2. The exchange of data between the simulation programs 64.1, 64.2 and the development program 72.1 takes place by way of a format conversion unit 76—also referred to as a "parser"—which is part of the interface 68.

Moreover, the simulation unit 56 has a route simulation program 78 by means of which simulation data is generated, which is taken into account in the embodiment of simulation processes by the simulation programs 64.

This simulation data is used to reproduce route-related conditions in which the vehicle components 60 are controlled when travelling on a route. The integration of this simulation data takes place by way of the stationary control unit 42 which is connected to the route simulation program 78 in terms of data.

According to a first test mode of the stationary control unit 42 embodied as a pure simulation mode, in a simulation process of the simulation unit 56 the vehicle components 60 embedded in the simulation environment 62 are controlled. This control takes place, in particular, by means of the stationary control unit 42 by way of the computing unit 58, which performs at least one simulation program with a HIL and/or SIL function. The control of the vehicle components 60 by the stationary control unit 42 is shown diagrammatically in FIG. 3 by means of arrows S1 and S2, which indicate control connections established between the control unit 42 and the components 60. By way of a further control connection S3, likewise shown in a highly diagrammatic manner, elements of the wiring 61 are activated by the control unit 42. For example, wire connections can be activated or deactivated, for example, to simulate a line break. In this mode, there is data traffic between the stationary control unit 42 and the simulation unit 56 in which control data for the performance of a simulation process is transferred from the control unit 42 to the simulation unit 56 and simulation data generated by a simulation process is transferred to the control unit 42.

In the embodiment of the simulation mode the simulation data generated by the route simulation program 78 can also be taken into account. As aforementioned, the simulation program with a HIL and/or SIL function uses simulation data of the computer-aided development system 70. The simulation mode of the control unit 42 is, in particular, designed on the basis of software 80 with which the stationary control unit 42 is equipped and which corresponds to corresponding, real control software of the rail vehicle 10 which, for example, is executed by a real controller of the rail vehicle 10 in its operation. The software 80 is stored in the storage unit 50.

A simulation process executed in simulation mode generates simulation data which by way of the data connection 57 is evaluated by the stationary control unit 42 and/or stored for subsequent evaluation.

The interactions of the stationary control unit 42 with the rail vehicle 10 and its real components are explained in more detail with reference to FIG. 4. This shows the stationary control unit 42, the central control unit 24 of the rail vehicle 10 and the data connection 53. In addition, a drive controller 18, a brake control unit 22 and a subsystem control unit 28 are shown diagrammatically. The data bus system 34 and a protection loop 36 are likewise shown.

The subsystem control units 28, the drive controllers 18 and the brake control units 22 are, on the one hand, in operative connection in terms of data with vehicle components which, in particular, correspond to sensor units 32, actuators 30 and wiring, and on the other hand, as aforementioned in operative connection with the central control unit 24.

The stationary control unit 42 can influence vehicle processes by way of the data connection 53 with the central control unit 24. The stationary control unit 42 and the central control unit 24 are provided to establish and operate control connections in interaction by way of the data connection 53. As aforementioned, the stationary control unit 42 is equipped with the software 80 for this. This corresponds to real software which is installed on the rail vehicle 10. As shown in FIG. 4 by means of arrows B and S, each of which indicates a control connection, the stationary control unit 42 can influence data traffic over the data bus system 34 and processes based on the activation of a protection loop 36.

Further test modes of the stationary control unit 42 are now described.

In a test mode of the stationary control unit 42, it is used to download sensor data by way of the data connection 53, which is recorded by at least one sensor unit 32 of a subsystem 26 and, for example, can be provided in the form of diagnostic data for storage and/or the evaluation of the rail vehicle 10. In this case, there is data traffic between the rail vehicle 10 and the stationary control unit 42 in which the sensor data is transferred to the latter.

In a further test mode, the stationary control unit 42 is used to test at least one particular vehicle process in a subsystem 26—for example, a process of an actuator 30 of the same, in a drive unit 14 and/or a brake unit 20, 21. The vehicle process can be initiated, altered in particular, controlled or regulated, or terminated by the stationary control unit 42. Process data which is generated in connection with the vehicle process is downloaded by the stationary control unit 42 for storage and/or evaluation. In this case, there is data traffic between the rail vehicle 10 and the stationary control unit 42, in which control data is transferred from the control unit 42 to the rail vehicle 10 and recorded process data is transferred from the rail vehicle 10 to the control unit.

The test modes of the stationary control unit 42 described below each comprises data traffic of the stationary control unit 42 with the rail vehicle 10 and with the simulation unit 56.

In a test mode of the stationary control unit 42, process data of a vehicle process of the rail vehicle 10 is evaluated on the basis of simulation data of a simulation process of the simulation unit 56. For example, as aforementioned, sensor data in the rail vehicle 10 can be recorded and transferred to the test center 40. In a particular example this sensor data is data of a drive unit 14, in particular, voltage, drive power and a temperature in a power supply unit 17. This sensor data is recorded during the line operation of the rail vehicle 10. The stationary control unit 42 triggers a simulation process of the simulation unit 56 in which the temperature of a drive unit reproduced in the simulation unit 56 is determined under the same voltage and performance conditions. The process data recorded by the vehicle process, i.e. the sensor data, correspond to a current status in the rail vehicle 10 and the simulation data generated by the simulation process is assigned a target status in the rail vehicle 10. If there is process data and simulation data, a target-actual comparison can be performed immediately by the stationary control unit 42, wherein a deviation triggers an instruction to an operator of the control unit 42 by way of the output device 46 and/or an automatic information processing unit.

In a further test mode of the stationary control unit 42, simulation data of the simulation unit 56 is changed on the basis of process data of a vehicle process of the rail vehicle 10. This test mode can, in particular, be used to automatically record changes which were made on the rail vehicle 10 and to take them into consideration in the simulation unit 56. For example, it is assumed that in the rail vehicle 10 a ventilation unit with a specific rated output was replaced by another ventilation unit with a different rated output. A vehicle process triggered by the stationary control unit 42 records the rated output of the ventilation unit, for example, as a test operation of the ventilation unit. This process data is taken into account in the simulation unit 56 which stores the new value after comparison with an existing value. This new value is then included in a simulation relating to the operation of the ventilation unit. Furthermore, this test mode can be used to take into account a change in value in the simulation unit 56 which occurs due to a malfunction of the ventilation unit.

In a further test mode, the alteration of simulation data of the simulation unit 56 on the basis of process data of the rail vehicle 10 may comprise an adjustment of data in the sets 74 of data which form part of the computer-aided development system 70. If, for example, a new component is installed in the rail vehicle 10, this can be recorded by a vehicle process of the rail vehicle 10. Corresponding process data which is generated in the process is evaluated by the stationary control unit 42, which produces an automatic update of the corresponding component library of the computer-aided development system 70 and/or an automatic adjustment of circuit diagram data.

In a further test mode of the stationary control unit 42, a vehicle process of the rail vehicle 10 is at least partially influenced on the basis of simulation data of a simulation process of the simulation unit 56. In this mode, a vehicle process can be triggered by the stationary control unit 42. This takes place on the basis of simulation data which is used as condition parameters for the vehicle process. In a particular example, a function of the air-conditioning system of the rail vehicle 10 is to be tested, wherein this function corresponds to a regulation of the ventilation power as a function of the $CO_2$ concentration. This application situation is reproduced for a particular concentration value in a simulation process of the simulation unit 56 which generates input parameters for the vehicle process as simulation data. This simulation data is used by the stationary control unit 42 to control the operation of the air-conditioning system according to the concentration value observed by way of the data connection 53. As aforementioned, the stationary control unit 42 has software which corresponds to a version of the air-conditioning software of the rail vehicle 10. The operation of the air-conditioning system as a vehicle process generates process data, in particular, sensor data, which is evaluated by the stationary control unit 42 and in particular, is compared with simulation data from the simulation process.

In a further example, a fall-back level of the performance management of auxiliary drives is to be tested when part of the auxiliary operating power supply fails. This application situation is reproduced in a simulation process of the simulation unit 56 which generates input parameters for the vehicle process as simulation data. This simulation data is used by the stationary control unit 42 to control the corresponding regulating unit of real performance management in the rail vehicle 10. The operation of performance management as a vehicle process generates process data, in particular, sensor data, which is evaluated by the stationary control unit 42 and in particular, is compared with simulation data from the simulation process. This example corresponds to the case of a fault injection in which an invalid status is artificially generated in a subsystem of the rail vehicle 10. The simulation of a cable break is possible as a further example of a fault injection.

Figure 4:
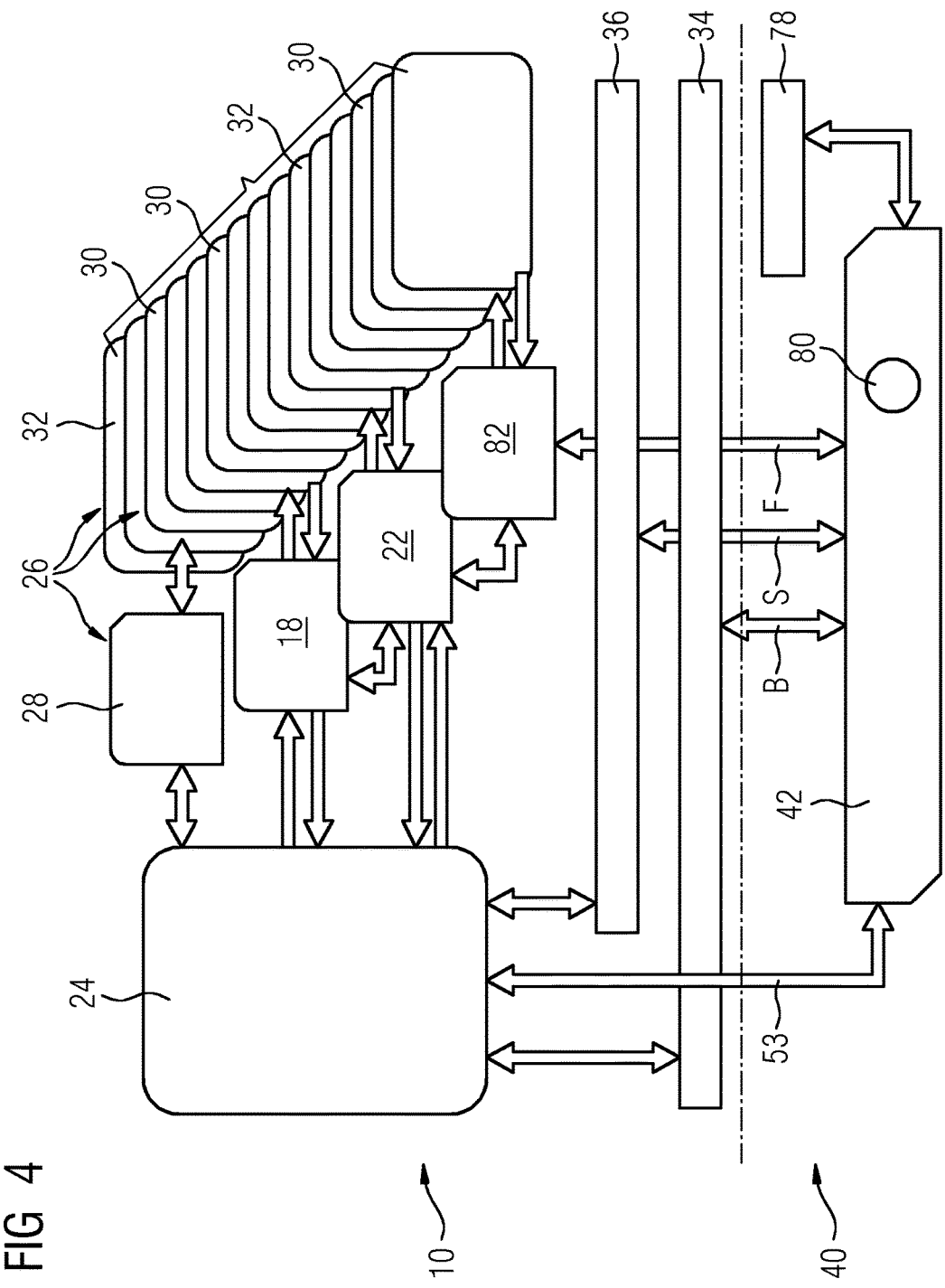

With regard to a fault injection concerning the functionality of the braking system—as shown in FIG. 4—in the rail vehicle 10 a special interface 82 can be implemented which is operatively connected with the stationary control unit 42 by way of a control connection F. This interface 82 is connected to a brake control unit 22 and an actuator of the rail vehicle 10.

The aforementioned test mode comprising a target-actual comparison of the stationary control unit 42 can be performed during line operation of the rail vehicle 10. As already discussed above, a deviation can trigger an instruction to an operator of the control unit 42 by way of the output device 46 and/or to an automatic information processing unit. Depending on the degree of deviation, various measures can be taken such as the notification to an operator or an automatic storage of the incident for subsequent evaluation. Certain major variations may arise as a result of conditions of the rail vehicle 10 which according to standardized personal protection are considered unsafe. The assignment of certain variations to such unsafe conditions is stored in the stationary control unit 42. Upon detection of an unsafe condition of the rail vehicle 10 with regard to personal protection, measures are taken by the stationary control unit 42 to restore the rail vehicle 10 to a safe condition. If it is not possible to establish a safe condition by remedying a detected fault, emergency braking of the rail vehicle 10 can be triggered as a measure.

The invention claimed is:

1. A method for carrying out a test process relating to a rail vehicle, the method comprising the following steps:
providing a stationary control unit and a simulator on a land side, the simulator including at least one processor;
providing the simulator with a simulation environment and real vehicle components embedded in the simulation environment, and using the simulation components of the simulation environment to reproduce a real environment of the vehicle components in a system constituted by the rail vehicle;
establishing a data connection between the stationary control unit and the rail vehicle;
establishing a data connection between the stationary control unit and the simulator; and providing the stationary control unit with data traffic of the rail vehicle and of the simulator and carrying out the test process by evaluating, with the stationary control unit, the data traffic of the rail vehicle and of the simulator.

2. The method according to claim 1, which further comprises transferring process data of a vehicle process to the stationary control unit, and using the stationary control unit to perform an assessment of the process data based on simulation data of a simulation process.

3. The method according to claim 1, which further comprises transferring process data of a vehicle process to the stationary control unit, and using the stationary control unit to effect a change in simulation data of the simulator based on the process data.

4. The method according to claim 3, wherein the change in the simulation data includes an adjustment of at least one data set based on the process data.

5. The method according to claim 1, which further comprises using the stationary control unit to influence at least one vehicle process at least partially based on simulation data of a simulation process.

6. The method according to claim 5, which further comprises using the simulation data to reproduce at least one fault in the rail vehicle.

7. The method according to claim 1, which further comprises:
   providing a computer-aided development system; and
   providing the simulator with an interface establishing data communication with the computer-aided development system.

8. The method according to claim 7, which further comprises providing the computer-aided development system with at least one data set of simulation data selected from the group consisting of circuit diagram data, component libraries and library data for a design program.

9. The method according to claim 1, which further comprises performing the test process during line operation of the rail vehicle.

10. The method according to claim 9, which further comprises using the test process to detect an unsafe condition of the rail vehicle and restoring the rail vehicle to a safe condition.

11. The method according to claim 10, which further comprises triggering emergency braking of the rail vehicle in an event of an unsafe condition.

12. A device for carrying out a test process relating to a rail vehicle, the device comprising:
   a stationary control unit, a simulator and a data interface provided on land, said simulator including at least one processor;
   said simulator having a simulation environment and real vehicle components embedded in the simulation environment, wherein the simulation components of the simulation environment reproduce a real environment of the vehicle components in a system constituted by the rail vehicle;
   said stationary control unit being operatively connected to said simulator in terms of data;
   said stationary control unit being configured to establish a data connection with the rail vehicle through said data interface; and
   said stationary control unit being configured to carry out the test process by evaluating data traffic of the rail vehicle and of the simulator.

13. The device according to claim 12, wherein said stationary control unit is configured to evaluate process data of a vehicle process of the rail vehicle based on simulation data of a simulation process of said simulator.

14. The device according to claim 12, wherein said stationary control unit is configured to influence at least one vehicle process at least partially based on simulation data of a simulation process.

* * * * *